J. REINEHR.

RAIL LAYING APPARATUS.

APPLICATION FILED JUNE 28, 1913.

Reissued Aug. 5, 1913.

13,602.

2 SHEETS—SHEET 1.

WITNESSES:

H. M. Gillespie

J. B. Lagond

INVENTOR.

John Reinehr

BY

Barnett & Truman

ATTORNEY.

COLUMBIA PLANOGRAPH CO., WASHINGTON, D. C.

J. REINEHR.

RAIL LAYING APPARATUS.

APPLICATION FILED JUNE 28, 1913.

Reissued Aug. 5, 1913.

13,602.

2 SHEETS—SHEET 2.

WITNESSES:
H. M. Gillespie
J. B. Lagrin

INVENTOR.
John Reinehr
BY
Barnett & Pillman
ATTORNEYS

COLUMBIA PLANOGRAPH CO., WASHINGTON, D. C.

UNITED STATES PATENT OFFICE.

JOHN REINEHR, OF SAVANNA, ILLINOIS, ASSIGNOR, BY DIRECT AND MESNE ASSIGNMENTS, TO RAIL LAYING MACHINE COMPANY, A CORPORATION OF ILLINOIS.

RAIL-LAYING APPARATUS.

13,602. Specification of Reissued Letters Patent. Reissued Aug. 5, 1913.

Original No. 948,023, dated February 1, 1910, Serial No. 525,519. Application for reissue filed June 28, 1913. Serial No. 776,459.

*To all whom it may concern:*

Be it known that I, JOHN REINEHR, a citizen of the United States, and a resident of Savanna, in the county of Carroll and State of Illinois, have made certain new and useful Improvements in Rail-Laying Apparatus, of which the following is a specification.

My invention relates to apparatus for re-laying railroad rails and has for its object to provide a novel form of apparatus whereby the re-laying of the rails of a railroad may be accomplished more expeditely and economically than has heretofore been possible.

In re-laying the rails of a railroad the new rails have always, so far as I am aware, been picked up and put in place by hand labor. Ordinarily the new rails are carried along on the old track on cars and thrown off the cars one by one. The old rails on that side of the track are then removed from the ties and the new rails grappled with hand tongs and put in the places of the old rails. The same procedure is, of course, followed at the other side of the track. This method of laying the new rails requires the expenditure of a great deal of time and labor. It takes a large gang of laborers to lift the rails from the places where they are strewn along the shoulder of the roadbed and carry them to their places on the ties; and, of course, this amount of labor increases with the modern tendency to use increasingly heavier rails.

The principal object of my invention is to provide a suitable form of apparatus which will do away with the lifting and putting in place by hand of the new rails and to thereby simplify, expedite and cheapen the cost of re-laying a railroad track.

My invention as embodied in a preferred form of apparatus is shown in the accompanying drawings, wherein—

Figure 1:
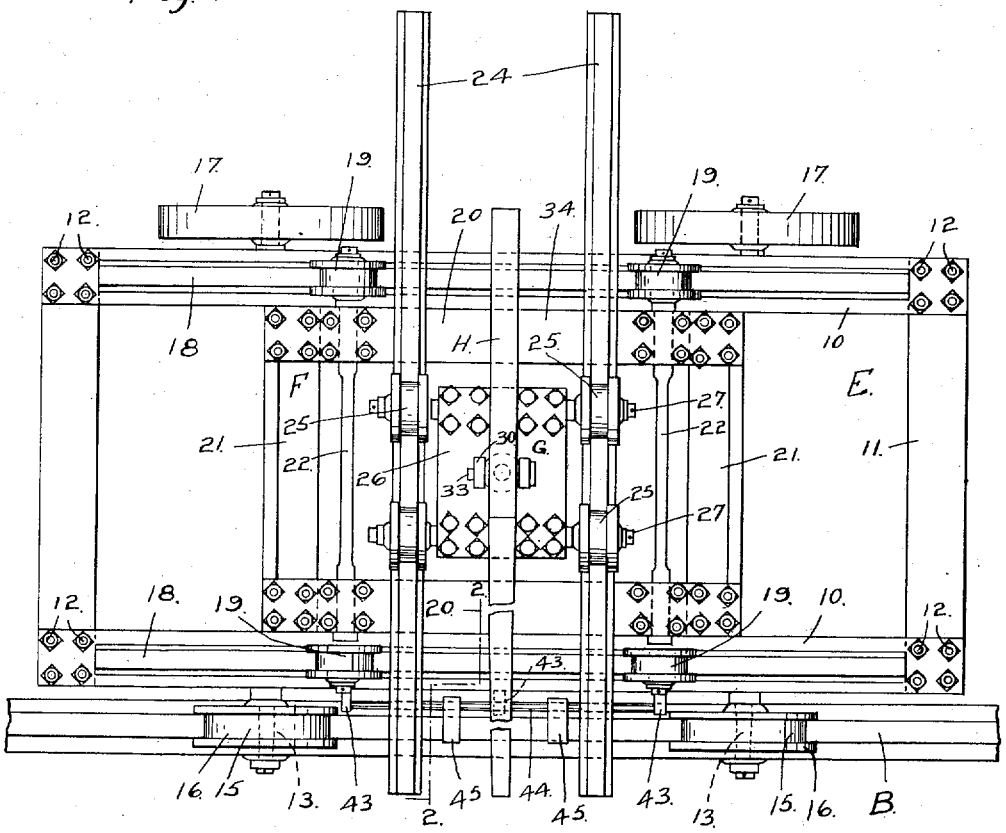
Figure 2:
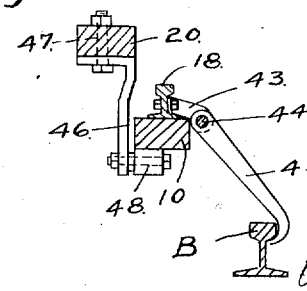
Figure 3:
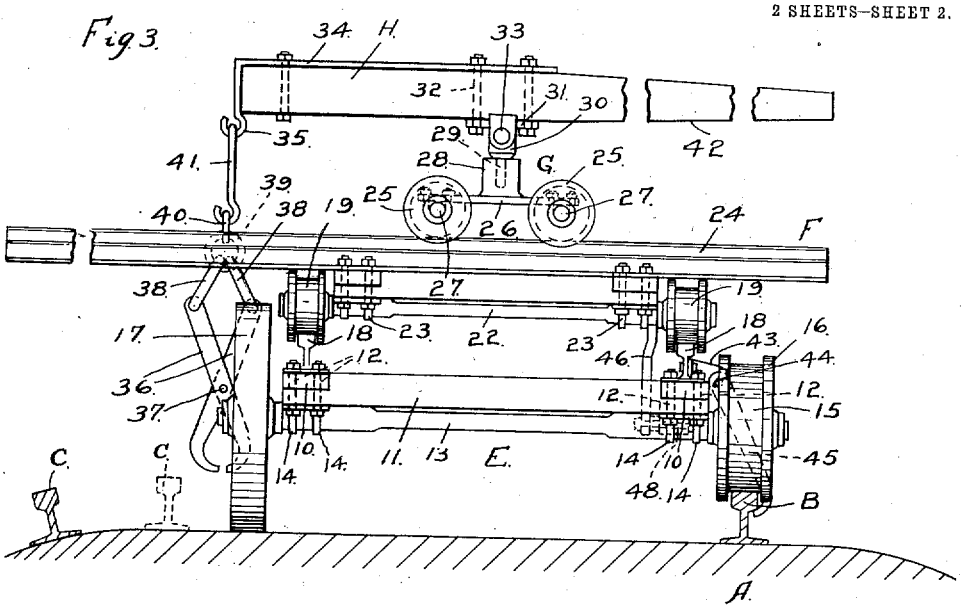
Figure 4:
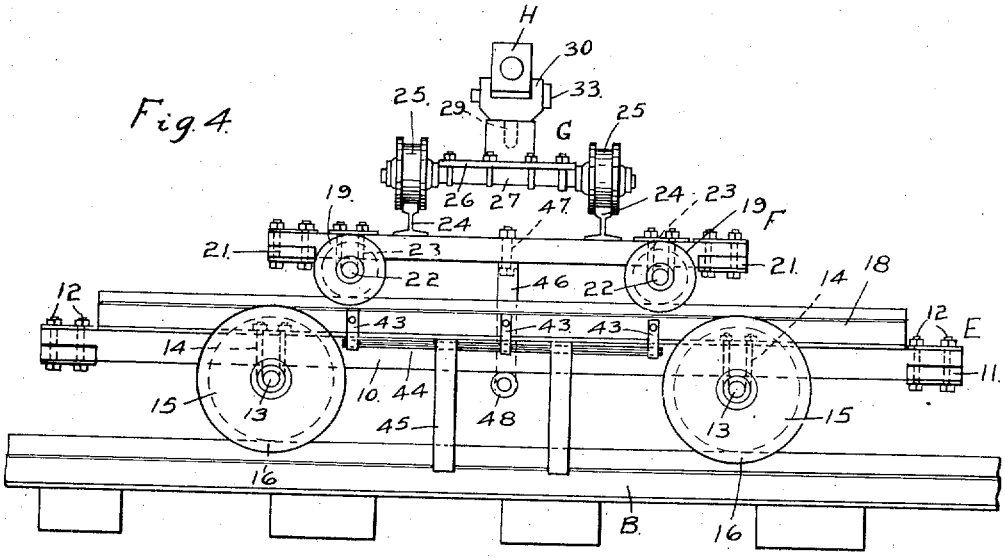

Figure 1 is a plan view of the apparatus; Fig. 2, a fragmentary sectional view on line 2—2 of Fig. 1, looking in the direction of the arrows; Fig. 3, an end elevation, and Fig. 4, a side elevation.

Like characters of reference indicate like parts in the several figures of the drawings.

Referring to the drawings, A represents the roadbed, B one of the rails of that side of the track which is not being operated upon, B representing, that is, either one of the rails of the old track not as yet taken up, or a new rail which has just been laid, as the case may be.

C represents one of the new rails about to be laid, the full lines (Fig. 3) indicating its position as it is thrown on the shoulder from the flat car, and the dotted lines in the same figure, the final position which it takes on the ties.

The re-laying apparatus of my invention as I prefer to construct it, consists of a truck E, which is adapted to run along the line of the track, on which is mounted a carriage F which preferably moves longitudinally of the truck E and of the track; and of a second carriage G mounted on the first carriage F preferably so as to move crosswise of the same, and of the track; this carriage having mounted thereon a lever H from which is suspended means for grappling the rail.

As shown, the truck E consists of a framework composed of the side pieces 10 and end pieces 11 which are preferably of wood and secured together by the bolts 12. This frame is mounted on the axles 13, secured to the frame by the stirrups 14, the axles having, on one side of the truck, the wheels 15 provided with one or more flanges 16, adapting them to run on the rails B, and on the other side of the truck, that is on the side of the track on which the work is being done, the wheels 17 which are designedly of considerably greater diameter in order that they may run over the roadbed with sufficient smoothness. On the side pieces 10 of the truck E are the rails 18 which carry the wheels 19 of the carriage F. The carriage F may be of construction similar to that of truck E, consisting of a frame composed of the side pieces 20 and the end pieces 21, the wheels 19 being carried on axles 22 secured to the frame by the stirrups 23. Crosswise of the carriage F are the rails 24, which preferably extend beyond the sides of the carriage as shown, and on the working side project for some considerable distance over the shoulder of the roadbed. On these rails run the wheels 25 of the carriage G, this carriage being shown as consisting of a platform 26, to the under side of which are secured the axles 27 of the wheels 25. On the platform 26 is a socket 28 which receives the shank 29 of a yoke 30 in which is mounted the lever H, the latter having the bearing 31 secured to the under side thereof by bolts 32, a pin 33 extending through the bearing and yoke 30. The lever may consist of a heavy timber reinforced by the metal strip 34 which is shown as bent over the end of the timber and formed with the hook 35. The rail grappling means is shown as the usual gravity tongs, consisting of the two members 36 pivoted together at 37 and connected by links 38 with the ring 39 which hangs from the ring 40, supported by the hook 41 from hook 35. The other end of the lever is of suitable length to project beyond the side of the apparatus at any position of the carriage G. For convenience of illustration this handle end 42 of lever H is not shown at its full length. The handle end of the lever should be long enough for operations at all positions of the carriage G and long enough to provide considerable leverage in lifting the rails.

As there may be some danger that the apparatus will be overturned, if the carriage G is run out toward the extremity of the rails 24, I prefer to provide means for holding truck E down upon rail B and for preventing, also, the possible tilting of the carriage F on the truck. This means is shown in detail in Fig. 2, and incidentally in the other figures. Secured to the rail 18 on the other side of the machine from the working side are the brackets 43 supporting a rod 44 on which are one or more hooks 45 which extend under the ball of rail B. The hooks resist any tendency of the truck to tilt downwardly on its working side.

The carriage F is engaged to the carriage E by means of a strap 46 secured to the under side of the side piece 20 by bolt 47, or otherwise, this strap carrying the roller 48 which runs along the under side of the side piece 10 of truck E. The wheels 17 are shown as running on the roadbed itself. It is clear that if thought desirable, stringers might be provided along the ties on which the wheels 17 could run.

The operation of the apparatus described is as follows: The truck B is moved by hand or otherwise until it comes about opposite the rail to be placed in position on the ties; this rail, shown in Fig. 3 at C, being supposed to have been at the side of the track at a greater or less distance from the ties and approximately opposite the place it is to occupy when forming a part of the re-laid track. The carriage G is run out on the rails 24 and, before or after this, the carriage F is moved one way or the other so that the grappling tongs can be made to take hold of the rail substantially at its middle point. Lever H is then tilted far enough to pick up the rail from the ground and raise it slightly above the level of the ties, and thereupon the carriages F and G are moved so as to bring the rail, thus balanced in the tongs, to a position above that which it is to occupy on the ties. The rail may then be lowered upon the ties, and, if need be, guided by hand into proper alinement with the preceding rail. In this way the rails may be successively laid one against the end of the other, and thereafter may be spiked to the ties in the usual manner. The positioning of the rail is facilitated by the fact that the lever is mounted so as to swing laterally, although this is perhaps not essential. The truck itself, the carriages which it supports and the lever may, of course, be moved by suitable machinery, although it will be quite possible to operate the apparatus by hand power, in which case it will require but a few men to accomplish the laying of the rails. The carriage G, for example, may be moved by pushing or pulling on the lever H, and the carriage E, by pushing one way or another on the projecting ends of rails 24 on one side or the other of the apparatus; or the rail may be moved and the carriages follow.

If desired, the trucks F and G or equivalent means for shifting the rail might be mounted on the ordinary push-car adapted to run along on the old rails before such rails had been removed from the track on either side; in which case the apparatus could be used for lining up the new rails in position to be quickly laid in the places of the old rails, after the latter should have been removed, as above described.

I do not limit myself to the particular constructions and arrangements shown as, obviously, modifications may be devised which will be within the scope of my invention.

I claim:

1. In apparatus of the character described, the combination with rail grappling means, of means for raising and lowering the same, and means for horizontally shifting the support for the same to any desired position both longitudinally and transversely with respect to the roadbed operated upon, for the purpose described.

2. In apparatus of the character described, the combination with a car adapted to travel along the roadbed, of rail grappling means, means for raising and lowering said rail grappling means, and means for horizontally shifting the support for said rail grappling means to any desired position both longitudinally and transversely with respect to the car, for the purpose described.

3. In apparatus of the character described, the combination with supporting means which is adapted to travel along the roadbed, of means for grappling a rail, raising and lowering it and moving it from place to place, wheels on one side of said supporting means which are adapted to run on a rail, and wheels on the other side of the same which are adapted to run directly on the roadbed.

4. In apparatus of the character described, the combination with supporting means which is adapted to travel along the roadbed, of means for grappling a rail, raising and lowering it and moving it from place to place, wheels on one side of said supporting means which are adapted to run on a rail, and wheels on the other side of the same of larger diameter which run directly on the roadbed.

5. In apparatus of the character described, the combination with supporting means which is adapted to travel along the roadbed, of means for grappling a rail, raising and lowering it and moving it from place to place, wheels on one side of said supporting means which are adapted to run on a rail, wheels on the other side of the same which are adapted to run directly on the roadbed, and means on said supporting means which engages said rail, for the purpose described.

6. In apparatus of the character described, the combination with supporting means, of rail grappling means, means for raising and lowering the rail grappling means, and means for moving the support for the raising and lowering means in horizontal planes to any desired position relative to the supporting means.

7. In apparatus of the character described, the combination with a car adapted to travel along the roadbed, of rail grappling means, mechanism for raising and lowering said rail grappling means, and means for bodily shifting the position of said raising and lowering mechanism, on said car.

8. In apparatus of the character described, the combination with supporting means, of rail grappling means and means for raising and lowering the grappling means and for moving it in a horizontal plane; wheels on one side of said supporting means which are adapted to run upon the rail, and wheels on the other side of the same which run directly on the roadbed.

9. In apparatus of the character described, the combination with supporting means, of rail grappling means and means for raising and lowering the grappling means and for moving it in a horizontal plane; wheels on one side of said supporting means which are adapted to run upon the rail, wheels on the other side of the same which run directly on the roadbed, and means on said supporting means which engages said rail, for the purpose described.

10. In apparatus of the character described, the combination with a car adapted to travel along the roadbed, of rail grappling means suspended at the side of said car, means for raising and lowering said rail grappling means, and means for bodily shifting said raising and lowering means transversely and longitudinally on the car.

11. In apparatus of the character described, the combination with movable supporting means, of a carriage mounted so as to move on said supporting means, a second carriage mounted on the first carriage, and rail grappling means mounted on the second carriage so that it may be raised or lowered.

12. In apparatus of the character described, the combination with a truck adapted to travel along the roadbed, of a track on said truck, a carriage mounted on said track and provided with a track transversely arranged with respect to the track on the truck, a second carriage mounted on the track on the first carriage, and rail grappling means mounted on said second carriage.

13. In apparatus of the character described, the combination with a truck adapted to travel along the roadbed, of a track on said truck, a carriage mounted on said track and provided with a track transversely arranged with respect to the track on the truck, a second carriage mounted on the track on the first carriage, rail grappling means mounted on said second carriage so as to be raised and lowered.

14. In apparatus of the character described, the combination with a truck adapted to travel along the roadbed, of a track on said truck, which extends crosswise of the roadbed, a carriage mounted on said track and provided with a track transversely arranged with respect to the track on the truck, a second carriage mounted on the track on the first carriage and rail grappling means mounted on said second carriage.

15. In apparatus of the character described, the combination with a truck adapted to travel along the roadbed, of a track on said truck, a carriage mounted on said track and provided with a track transversely arranged with respect to the track on the truck, a second carriage mounted on the track on the first carriage, a lever on said second carriage, and rail grappling means on said lever.

16. In apparatus of the character described, the combination with a truck adapted to travel along the roadbed, of a track on said truck, a carriage mounted on said track and provided with a track transversely arranged with respect to the track on the truck, a second carriage mounted on the track on the first carriage, a lever on said second carriage, and rail grappling means on said lever, said lever being connected with the second carriage by a universal joint.

17. In apparatus of the character described, the combination with supporting means, of a carriage mounted so as to move on said supporting means, a second carriage mounted on the first carriage, rail grappling means mounted on the second carriage so that it may be raised and lowered, wheels on one side of said supporting means which are adapted to travel on the rail, and wheels on the other side of the same which run directly on the roadbed.

18. In apparatus of the character described, the combination with supporting means, of a carriage mounted so as to move on said supporting means, a second carriage mounted on the first carriage, rail grappling means mounted on the second carriage so that it may be raised and lowered, said supporting means provided on one side with wheels adapted to travel on a rail, means on the supporting means which engages said rail, and means on said first carriage which engages said supporting means, substantially as and for the purpose described.

19. In apparatus of the character described, the combination with a truck adapted to travel along the roadbed, of a track on said truck, a carriage mounted on said track and provided with a track transversely arranged with respect to the track on the truck which projects out over the shoulder of the roadbed, a second carriage mounted on the track on the first carriage, and rail grappling means on said second carriage.

20. In apparatus of the character described, the combination with a truck adapted to travel along the roadbed, of a track on said truck, a carriage mounted on said track and provided with a track transversely arranged with respect to the track on the truck which projects out over the shoulder of the roadbed, a second carriage mounted on the track on the first carriage, rail grappling means on said second carriage, and means for preventing the truck and first carriage from being overturned when the second carriage is run out on the projecting end of its track.

21. In apparatus of the character described, the combination with a truck provided on one side with wheels adapted to run upon a rail and upon the other side with wheels which run directly on the roadbed, of a carriage mounted on said truck, a second carriage mounted on the first carriage, rail grappling means mounted on said second carriage, a hook on said truck which engages the rail on which said truck runs, and means on said first carriage provided with a roller which runs on the under side of said truck, substantially as and for the purpose described.

22. In apparatus of the character described, the combination with supporting means, of a lever provided with rail grappling means which lever is mounted on said supporting means so that its fulcrum is movable thereon in straight lines longitudinally and transversely with respect to the roadbed.

23. In apparatus of the character described, the combination with supporting means, of a lever provided with rail grappling means, which lever is mounted with a universal joint and the fulcrum of which is movable on said supporting means longitudinally and transversely in straight lines with respect to the roadbed.

24. In apparatus of the character described, the combination with a truck adapted to travel along the roadbed, of a carriage mounted so as to move on said truck, a second carriage mounted so as to move on the first carriage, and rail grappling means mounted on said second carriage.

25. In apparatus of the character described, the combination with a truck adapted to move along the roadbed, of a rail supporting said truck at one side, rail grappling means, means comprising a carriage movable upon said truck for movably supporting said rail grappling means, an engaging device between the track and the truck to prevent the tipping of the latter, and an engaging device between the truck and said carriage for a like purpose.

26. In apparatus of the character described, the combination with a truck adapted to run on one side upon a rail, of a carriage mounted on said truck, a second carriage mounted on the first carriage, rail grappling means on said second carriage, a hook on the truck which engages the rail on which the truck runs, and means on said first carriage for movably engaging the truck, for the purpose described.

27. In apparatus of the character described, the combination with a car adapted to travel along the roadbed, of rail grappling means mounted on the car whereby rails at the side of the roadbed may be grappled, carried to and longitudinally adjusted in final position upon the ties of the roadbed at the side of said car.

28. In apparatus of the character described, the combination with a car adapted to travel along the roadbed, of rail grappling means mounted on the car whereby rails at the side of the roadbed may be grappled, carried to and longitudinally adjusted in final position upon the ties of the roadbed upon which the car runs, said means comprising a lever and grappling tongs suspended from said lever.

29. In apparatus of the character described, the combination with a car adapted to travel along the roadbed, of rail grappling means and means on said car for giving a shift to said rail grappling means of any desired relative amplitudes, pivotally and also longitudinally and transversely with respect to the car, and for raising and lowering said grappling means, for the purpose described.

30. In apparatus of the character described, the combination with a car adapted to travel along the roadbed, of rail grappling means, a lever from which the same are suspended, and means for giving shift to the fulcrum of the lever of any desired relative amplitudes, in straight lines longitudinally and transversely with respect to the car, for the purpose described.

31. In apparatus of the character described, the combination with a car adapted to travel along the roadbed, of a track mounted transversely thereon and extending outwardly from the side of the car, rail grappling means, means for movably suspending the rail grappling means on said track, and means for shifting the track lengthwise of the car.

32. In apparatus of the character described, the combination with a car adapted to travel along the roadbed, of a track mounted transversely thereon and extending outwardly from the side of the car, a carriage on said track, a lever on said carriage, and grappling means suspended from said lever.

33. In apparatus of the character described, the combination with a car adapted to travel along the roadbed, of a track extending outwardly from the side of the car, a carriage on said track, a lever on said carriage, grappling means suspended from said lever, and means for shifting the track lengthwise of the car.

34. In apparatus of the character described, the combination with a car adapted to travel along the roadbed, of rail grappling means mounted on the car, and adapted to be supported at one side of the car within the normal position of the rails on that side of the track, whereby rails at the side of the roadbed may be grappled, carried to and longitudinally adjusted in final position upon the ties of the roadbed, at the side of the car.

35. In apparatus of the character described, the combination with a car provided at one side with double flanged wheels adapted to run on rails at one side of the roadbed, and at the other side with means for supporting said car directly on the ties within the normal position of the rails on that side of the track, of rail grappling means mounted so as to overhang the car on the latter side thereof, means for actuating the grappling means to grapple and place a rail in normal position in the track at the side of said car, and means on the car to engage the rail on which said double flanged wheels rest, to prevent tilting of the car.

JOHN REINEHR.

Witnesses:
BEN B. HYLER,
W. C. HUBBELL.

Copies of this patent may be obtained for five cents each, by addressing the "Commissioner of Patents, Washington, D. C."